United States Patent [19]

Lippert et al.

[11] Patent Number: 4,737,176

[45] Date of Patent: Apr. 12, 1988

[54] HOT GAS CROSS FLOW FILTERING MODULE

[75] Inventors: Thomas E. Lippert; David F. Ciliberti, both of Murrysville Boro, Pa.

[73] Assignee: The United States of America as represented by the United States Department of Energy, Washington, D.C.

[21] Appl. No.: 930,218

[22] Filed: Nov. 12, 1986

Related U.S. Application Data

[63] Continuation-in-part of Ser. No. 864,700, May 19, 1986, abandoned.

[51] Int. Cl.$^4$ ................. B01D 46/24; B01D 29/06; B01D 29/32
[52] U.S. Cl. ........................... 55/480; 55/484; 55/502; 55/505; 55/523; 210/345; 210/347
[58] Field of Search ............... 55/374, 378, 478, 480, 55/502, 505, 511, 523, 521; 210/232, 344–347, 411

[56] References Cited

U.S. PATENT DOCUMENTS

| Re. 12,174 | 11/1903 | Draver | 55/285 |
|---|---|---|---|
| 645,322 | 3/1900 | Mitchell | 55/285 |
| 1,012,122 | 12/1911 | Budil | 55/502 X |
| 1,573,656 | 2/1926 | Terhune | 55/502 X |
| 2,050,508 | 8/1936 | Strindberg | 55/502 X |
| 2,394,076 | 2/1946 | Kisch | 210/345 |
| 3,074,561 | 1/1963 | Mummert | 210/347 X |
| 3,122,197 | 2/1964 | Saponara et al. | 55/505 X |
| 3,343,342 | 9/1967 | Rocher | 55/299 |
| 3,383,841 | 5/1968 | Olson et al. | 55/502 X |
| 3,385,033 | 5/1968 | Basore et al. | 55/502 X |
| 3,460,322 | 8/1969 | Rivers et al. | 55/502 X |
| 3,487,609 | 1/1970 | Caplan | 55/96 |
| 3,606,735 | 9/1971 | Baigas, Jr. | 55/273 |
| 3,606,737 | 9/1971 | Lefevre | 55/478 X |
| 3,854,902 | 12/1974 | Kalen | 55/96 |
| 4,343,631 | 8/1982 | Ciliberti | 55/302 |
| 4,504,293 | 3/1985 | Gillingham et al. | 55/502 X |
| 4,610,786 | 9/1986 | Pearson | 210/232 X |

FOREIGN PATENT DOCUMENTS

| 5372 | of 1901 | United Kingdom | 210/345 |
| 1314143 | 4/1973 | United Kingdom | 55/378 |

Primary Examiner—Robert Spitzer
Attorney, Agent, or Firm—D. C. Abeles

[57] ABSTRACT

A filter module for use in filtering particulates from a high temperature gas has a central gas duct and at least one horizontally extending support mount affixed to the duct. The support mount supports a filter element thereon and has a chamber therein, which communicates with an inner space of the duct through an opening in the wall of the duct, and which communicates with the clean gas face of the filter element. The filter element is secured to the support mount over an opening in the top wall of the support mount, with releasable securement provided to enable replacement of the filter element when desired. Ceramic springs may be used in connection with the filter module either to secure a filter element to a support mount or to prevent delamination of the filter element during blowback.

22 Claims, 5 Drawing Sheets

HOT GAS CROSS FLOW FILTERING MODULE

BACKGROUND OF THE INVENTION

The present invention was made under government contract DEAC21-84MC21338 and relates to a filter module containing ceramic cross flow filtering elements which are supported by horizontally extending support mounts about a central gas duct.

CROSS-REFERENCE TO RELATED APPLICATION

The present application is a continuation-in-part of our copending application, Ser. No. 864,700, filed May 19, 1986, now abandoned.

An apparatus for filtering particulates from a mixture of particulates in a high temperature gas is described in U.S. Pat. No. 4,343,631, assigned to the assignee of the present invention, the contents of said patent being incorporated by reference herein, U.S. Pat. No. 4,343,631 describes a high efficiency, compact, cross flow filter apparatus for removing particulate matter from a gas stream and, in particular, from a high temperature gas stream. The apparatus described contains a plurality of relatively small cross flow ceramic filter elements or blocks, and ducts and tubes that are nested in an arrangement to form a high density filter system. In the description of the preferred embodiment of that patent, a mounting arrangement is described where individual filter elements are seated or sealed to the central gas duct in such a manner that the filtered gas discharges from the filter elements directly into the central gas duct. As illustrated in FIG. 7 of the patent, one end of the filter element is sealed by a stud and bar clamp assembly which also attaches the filter element to the central gas duct. In such a mounting, the individual filter elements are essentially cantilevered from the central gas duct and held mechanically in place by the stud and bar clamp. Differential thermal expansion of the studs, and/or thermal warping of the central gas duct can cause loosening of the clamping arrangement and jeopardize the duct seal and/or mechanical integrity of the filter element. Such cantilevered mounting can thus cause the ceramic filter elements themselves to crack and/or delaminate.

Also, the reliability of such systems is affected by the tendency of the ceramic cross flow filter elements to delaminate during operation through thermal expansion and contraction, and due to the jet pulse cleaning sequence used to clean the filters.

It is an object of the present invention to provide a filter module containing ceramic cross flow filter elements about a central duct that provides for directly supporting the weight of the filter elements on a horizontal support mount that avoids the problems associated with cantilevered supports.

It is another object of the present invention to support ceramic cross flow filter elements about a central gas duct which provides a reliable dust seal and clamping arrangement.

It is a further object of the present invention to provide a support means for ceramic cross flow filter elements about a central gas duct which contains a gas plenum to optimize the distribution of the pulse cleaning gas flow within the cental gas duct manifold and provide better distribution of the cleaning pulse flow between each of the filter elements that are mutually mounted and supported by a common central gas duct.

It is yet a further object of the present invention to enhance the reliability of the cross flow filter system by providing a spring loading of the cross flow filter element, using ceramic springs in the high temperature environment of the filter elements, to compress the cross flow filter elements in a direction perpendicular to the mounting forces maintaining the filter elements on the horizontal support mount.

SUMMARY OF THE INVENTION

A filter module for filtering particulates from a high temperature gas has a central duct and at least one filter element supported on the duct by a horizontally extending support mount attached to the duct. The support mount has a chamber therein in fluid communication with the interior space of the duct and an opening in the top wall thereof in which a filter element is seated. The filter element is secured on the support mount over the opening in the top wall, with the filter element having inlet channels in communication with the chamber of the support mount and outlet channels in communication with the area exterior of the duct, with the inlet channels and outlet channels separated by a ceramic membrane that is permeable to the gases but impermeable to the particulates.

The filter element may be secured to the filter mount, over the opening in the top wall, by means of a flange about the lower end of the filter element which seats on an inwardly directed rim about the periphery of the opening, and a ring member which contacts the upper surface of the flange and is releasably secured to the top surface of the support mount, or by other securement. Or, with use of a plurality of support mounts and associated filter elements arranged in a row along the vertical axis of the central duct, adjustable columnar supports may be interposed between a support mount and a subjacent filter element to secure the filter element in sealing relationship with the subjacent support mount.

The present invention also provides filter element modules which use ceramic springs as engagement means to secure a filter element on a support plate, and as a delamination retarding means to enhance the reliability of cross flow filter elements. Ceramic springs are disposed between a horizontal brace or a superimposed support mount, so as to provide a sealing load to the top of a filter element, thus forcing the opposite face into a gasketed joint with the support plate. The ceramic springs may also be used to exert a force against the end of a filter element in a direction perpendicular to the mounting force so as to put the filter element under compression in a direction that opposes the pressure forces that tend to delaminate the layers of the filter element during pulse jet cleaning of the ceramic cross flow filter element.

DETAILED DESCRIPTION

Figures 1, 2:
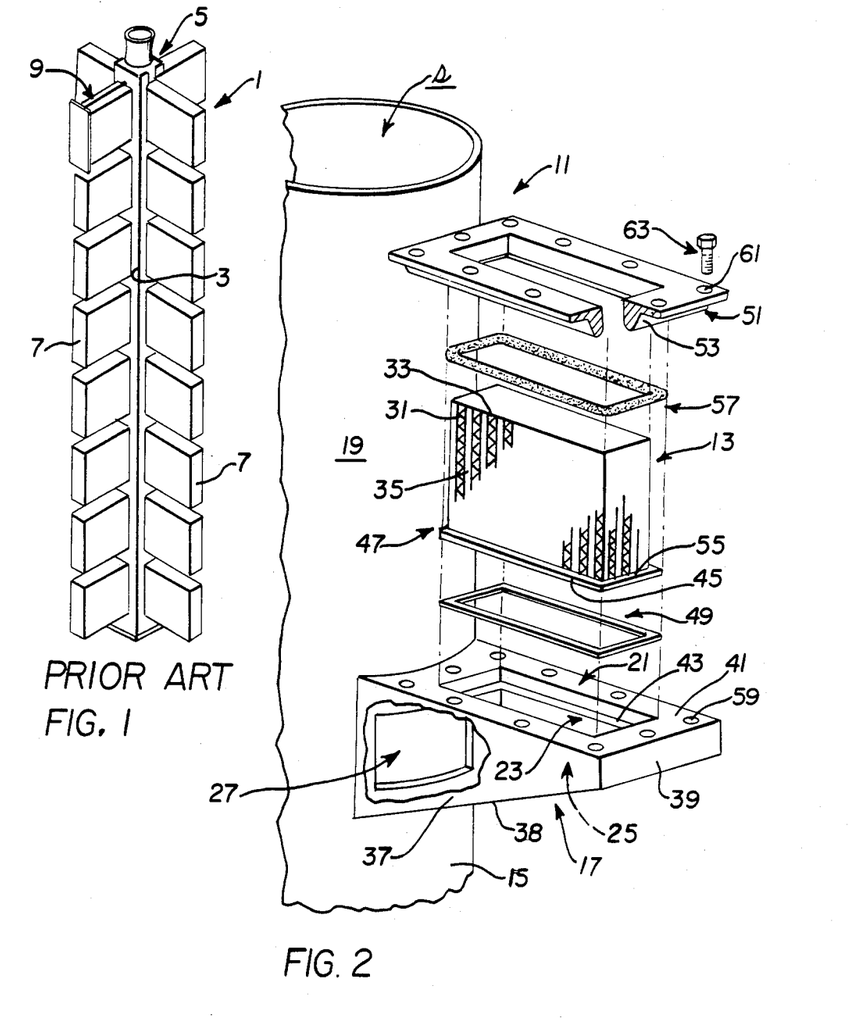
FIG. 1 is a perspective view of a prior art filter module with a centilevered type of mounting on a central duct.
FIG. 2 is an exploded perspective view of a filter module of the present invention, with a portion cut away, showing a filter element having a flange thereon and the securement means therefor.

A previous means for mounting a plurality of ceramic filter elements on a central gas duct, as described in U.S. Pat. No. 4,343,631, is illustrated in FIG. 1. The filter module 1, has a central duct 3 with an interior space 5, and a plurality of ceramic filter elements 7 arranged in rows parallel to the vertical axis of the central duct 3 in spaced relationship to each other. The mounting of the filter elements 7 to the central duct 3 is effected by having a stud and bar clamp assembly 9 (one shown) which attaches the filter elements 7 to the central duct 3. Such a mounting results in a cantilevered attachment of the filter elements to the central duct and could cause problems of stress on the filter elements due to differential thermal expansion of the stud and bar clamp or thermal warping of the central gas duct, which are detrimental to the integrity of the ceramic filter elements. Especially where relatively large size ceramic filter elements, such as filter elements of a size of 12"×12"×4" are used, such a cantilevered mounting can cause problems.

Figure 3:
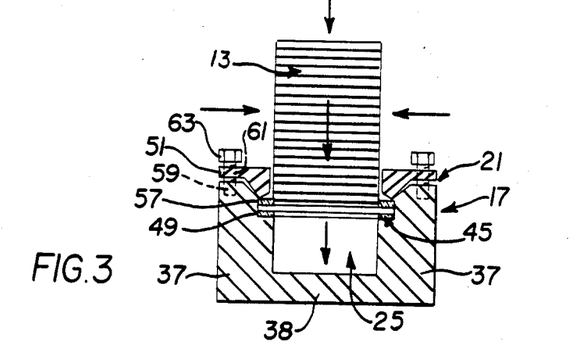
FIG. 3 is a vertical cross-sectional view through the filter element and support mount of FIG. 2 in assembled condition.

According to the present invention, a means of mounting the filter elements on the central gas duct is provided which avoids problems associated with cantilevered mounting systems. Referring now to FIGS. 2 and 3, the present filter module 11, comprises at least one, and preferably a plurality, of ceramic filter elements 13 which are arranged about a central duct 15, having an interior space s, by use of horizontally disposed support mounts 17. Preferably, the central gas duct is cylindrical, with an annular wall and the support mounts 17 have an annular face cooperating therewith.

The support mount 17, is horizontally secured to the outer wall 19 of the central gas duct 15, such as by welding or other securement, and extends outwardly from the central gas duct 15. The support mount 17 has an upper surface 21 which has an opening 23 therethrough, and an inner chamber 25 which communicates with the opening 23, and with the interior space s of the central gas duct 15 through an opening 27 in the wall 19 thereof. The filter element 13 is secured to the upper surface 21 of the support mount over the opening 23 to seal the opening 23. As is conventional, and schematically illustrated, the filter element 13 has layered inlet channels 31 and outlet channels 33. The inlet channels 31 are disposed in fluid communication with the chamber 25 of the support mount 17 and the outlet channels 33 in fluid communication with the exterior area about the central duct 15, with the inlet channels 31 and outlet channel 33 separated by a ceramic membrane 35 which is permeable to high temperatures gases but impermeable to particulates carried by the gases.

In a preferred embodiment of the present filter module, the support mount 17 is in the form of a housing having two closed side walls 37, a closed bottom wall 38, an outer closed end wall 39, and a top wall 41 which has the opening 23 formed through the upper surface 21 thereof. An inwardly directed rim 43 extends from the top wall 41 about the periphery of the lower portion of the opening 23 through the top wall 41. A cooperating flange 45 is provided about the lower end, or clean gas discharge end, 47 of the filter element 13, such that the flange 45 may be seated atop the rim 43, with a gasket 49 therebetween that provides complete sealing of the seating arrangement. The gasket 49 is a compressible gasket suitable for high temperature applications and may be formed of a material such as 3M Corporation's INTERAM ® material or Carborundum Corporation's FIBER FRAX ® material. In order to secure the flange 45 and filter element 13 against the rim 43 of the top wall 41 of the support mount 17, a ring member 51 is provided. The ring member 51 has a downwardly directed lip 53 on the inner periphery thereof which is sized so as to contact the top surface 55 of the flange 45 of the filter element 13 when assembled on the support mount 17, with the flange 45 held in contact with the rim 43 on the support mount. Preferably, a compressible gasket 57 is interposed between the lip 53 and rim 43 to provide a complete seal therebetween. The compressible gasket 57 squeezes against the sides of the filter element and produces a lateral restraining force in addition to the downward force. Gasket 57 is formed of a material suitable for high temperature applications, such as 3M Corporation's NEXTAL ® rope. The ring member 51 is releasably secured to the support mount. One means of such releasable securement, as illustrated, comprises aperatures 59 formed in the top wall 41 of the support mount 17 and cooperating apertures 61 in the ring member 51, with bolts 63 securing these two members together.

In assembly of the filter module 11, an opening 27 is formed in the wall 19 of the central gas duct 15 and the support mount 17 is welded or otherwise secured to the wall 19 such that the opening 27 communicates with the chamber 25 of the support mount 17. Referring to FIG. 3, the gasket 49 is rested on the rim 43 of the top wall 41 of the support mount 17. The filter element 13 is then placed on the support mount 17 with the flange 45 seated on the gasket 49 and rim 43. The compressible gasket 57 is seated on the top surface 55 of the flange 45 of the filter element 13 and the ring member 51 placed thereover and secured to the support mount 17 by means of the bolts 63.

Alternative means for mechanical attachment of the ceramic filter element 13 to the support mount 17 may be used. For example, using a ceramic filter element with the flange 45 about the bottom portion thereof, apertures could be formed in the flange, and cooperating apertures formed in the rim 43 of the support element, with bolts secured therein to affix the ceramic filter element to the support mount. Also, filter elements without the flange 45 therabout can be used, with the filter elements sized so as to seat on the rim 43 of the support mount 17, using the ring member 51 and the compressible gasket 57 therebetween to mechanically fix the ceramic filter element with the ring member 51 releasably secured to the support mount 17. In addition, metal tabs or strips that pass through flow channels in the ceramic filter element and extend beyond the filter element, and are secured to the support mount, could be used to secure the filter element to the support mount.

Figure 4:
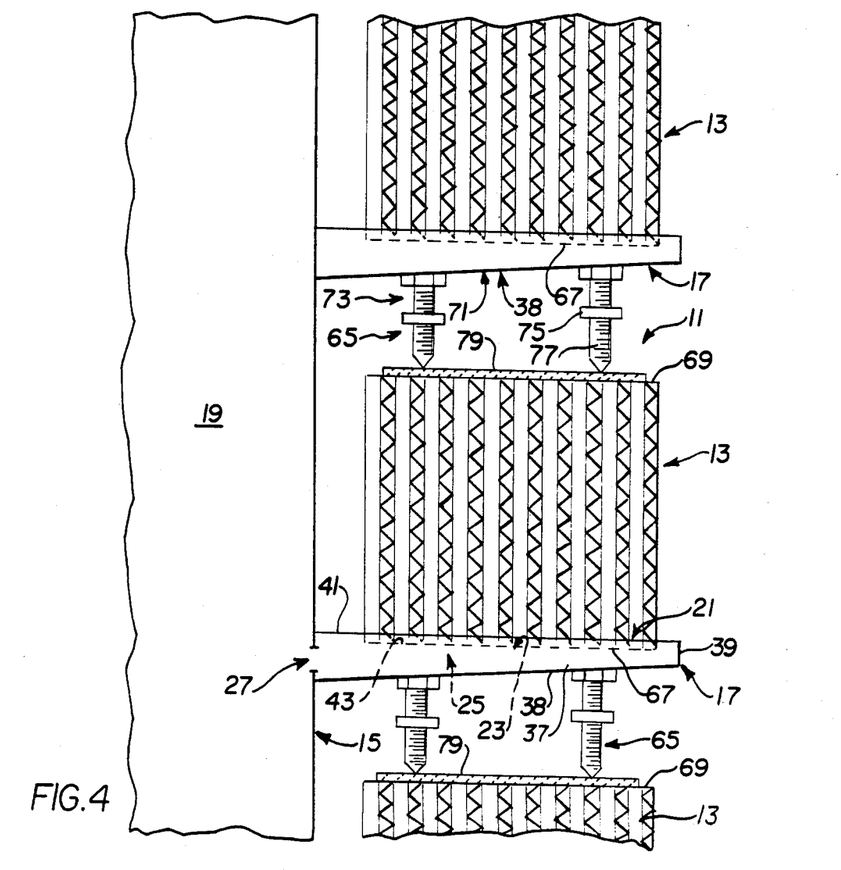
FIG. 4 is a schematic view of another embodiment of the present invention where vertical rows of filter elements and support mounts are used with adjustable columnar supports therebetween to secure a filter element to its respective support mount.

In a further embodiment, as illustrated in FIG. 4, the use of a plurality of spaced superimposed filter elements 13, which may be devoid of the flange 45, may be used with support mounts 17 by use of engagement means 65 disposed between adjacent sets of filter elements and support mounts. The support mounts 17 are secured to the central duct 15 as in the previous embodiment, with the chamber 25 communicating with the interior space of the central duct. The bottom wall 67 at the lower portion 47, or clean gas discharge end, of the filter element is seated on the inwardly directed rim 43 about the top wall 41 of the support mount 17. If desired, a gasket may be interposed therebetween for sealing purposes. With a plurality of the support mounts provided in superimposed spaced relationship along the vertical axis of the central gas duct 15, the top 69 of a subjacent ceramic filter element 13 will be spaced from the bottom 71 of a superimposed support mount. With at least one adjustable columnar support 73 attached to the bottom 71 of a support mount 17, the columnar support may be extended to contact the top 69 of a subjacent ceramic filter element which forces the bottom wall 67 of the subjacent ceramic filter element into sealing contact with the rim 43 of its respective support mount 17. The adjustable columnar support 73 may be in the form of an adjustable jack screw with a nut 75 threadable on a threaded shaft 77. A cushioning member 79 may be provided between the adjustable columnar member 65 and the top wall 69 of the filter element to protect the same from abrasion and distribute the downward forces exerted by the columnar members.

In the present filter module, the weight of the ceramic filter element 13 and the usual filter operating pressure loss provide a hydrostatic dust sealing force that enhances the mechanical sealing force that is also provided by the ring member 51. The hydrostatic pressure force (P in FIG. 3) naturally occurs during the operation of the filtering process and will be unaffected by the relative thermal expansion of the metal components. Additionally, the ceramic filter element is not constrained by clamp and studs that would normally encase the filter element block and make it susceptible to undesirable forces that would occur if the clamps, studs or central gas duct would deform due to nonuniform thermal expansion of metal components or from warping of those components due to thermal cycling.

In operation of a filter containing the filter modules of the present invention, the filtered gas discharges from the face or bottom of the filter element 13 that empties into the chamber 25 in the support mount 17. The collected and filtered gas then passes into the central gas duct 15 through the opening 27 in wall 19 over which the support mount is affixed. The size and shape is independent of the geometry and area of the force of the filter element from which the filtered gas discharges and which is sealed to the support mount 17. This arrangement provides significant design latitude for improving the distribution of the blowback pulse gas, as used in prior devices, along the vertical axis of the central gas duct 15 to which a plurality of filter elements are mounted. With the filter module of the present invention, the openings 27 can be sized and designed based on well-known manifold principles without the additional size constraint of accommodating the mechanical mount and dust seal directly on the central gas duct. This advantage will allow improved cleaning of the individual filter elements since the distribution of the blowback gas to each filter element is controlled by the size of the opening 27 to the support mount and not to the resistance area of the filtered elements. The opening 27 to respective support mounts may be varied in size to provide a desired distribution of blowback gas to each filter element through the chambers of the support mounts. The horizontal support mounts 17, in effect, act as a gas plenum system to optimize the distribution of the pulse cleaning flow within the central gas duct manifold.

Figure 5:
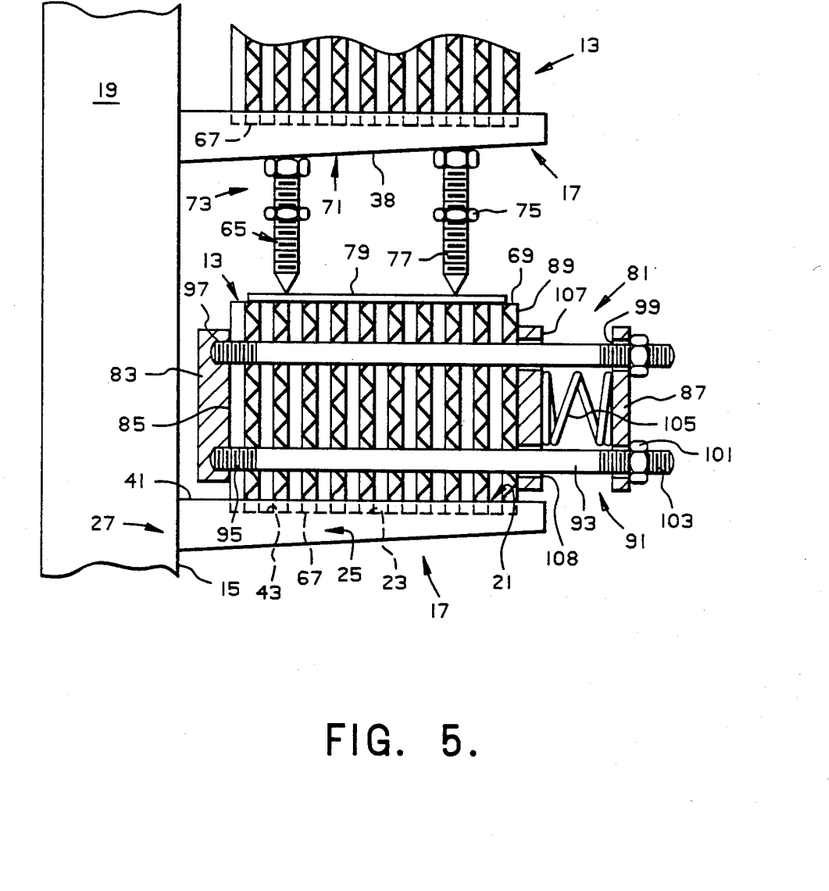
FIG. 5 is a schematic view of a further embodiment of the present invention wherein a ceramic spring is used to compress a cross flow filter element to prevent delamination thereof.

In another embodiment of the present invention, as illustrated in FIG. 5, a delamination retarding means is provided which uses a ceramic spring to compress the ends of the cross flow filter element. As illustrated, the delamination retarding means 81, associated with the cross flow filter element 13, comprises a first end plate 83 adjacent one end 85 of the filter element 13 and a second end plate 87 spaced from the opposite end 89 of the filter element 13. Securing means 91 is provided to adjustably connect the two end plates 83 and 87 together, shown as a pair of threaded rods 93 on each side of the filter element 13 (only one pair shown), which rods are threaded at their ends 95 thereof and threadably engaged in threaded bores 97 in the end plate 83. The threaded rods 93 extend through apertures 99 in the other end plate 87, and nuts 101, on threaded portions 103 of the rods 93, are used to adjust the distance between the end plates 83 and 87. At least one ceramic spring 105 is disposed between the second end plate 87 and the end 89 of the filter element, and preferably, a force distribution plate 107 is provided between the ceramic spring 105 and the second end plate 87, the force distribution plate 107 having apertures 108 therethrough, through which the rods 93 may pass.

The delamination retarding means, by tightening of the nuts 101, forces the ceramic spring to compress between the end plate 87 and the force distribution plate 107 and with the filter element enclosed between the two end plates 83 and 87, causes a predetermined compression force to be exerted on the filter in a direction perpendicular to the mounting forces, to thus retard delamination of the filter element.

Figure 6:
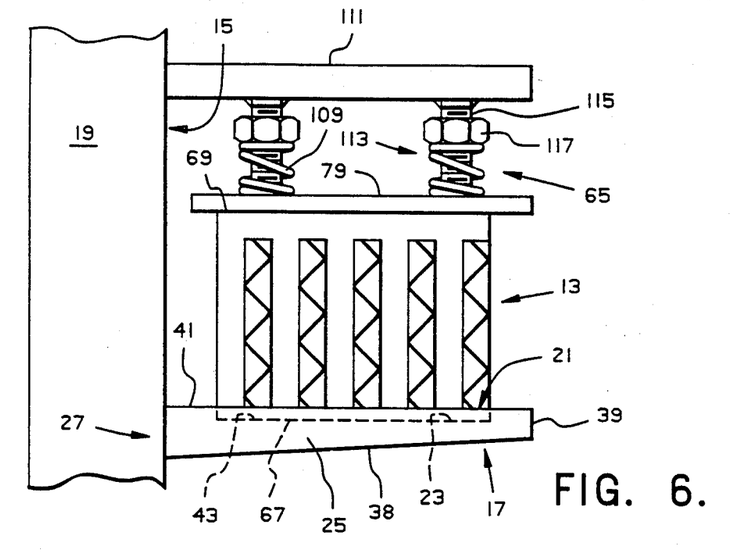
FIG. 6 is a schematic view of the use of a ceramic spring on a columnar member as an engagement means to secure a filter module to a support mount.

A further embodiment of the present invention using ceramic springs is illustrated in FIG. 6, wherein at least one ceramic spring 109 is used as a portion of the engagement means 65 to secure the filter element to the support mount 17. The means for securing, as illustrated, comprises a horizontally extending brace 111 fixedly secured, such as by welding, or by the use of mounting studs, to the gas duct 15, in a vertically spaced relationship relative to the support mount 17, with the engagement means 65 extending between the horizontally extending brace 111 and the top 69 of a filter sealed on the rim 43 about the top wall 41 of the support mount 17. The engagement means 65 comprises biasing means 113 shown as ceramic springs 109 disposed about posts 115 and biased between threaded nuts 117 and the top 69 of the filter element 13, with a cushioning member such as a metallic plate 79 positioned between the posts 115, springs 109, and the top 69 of the filter element 13.

Figure 7:
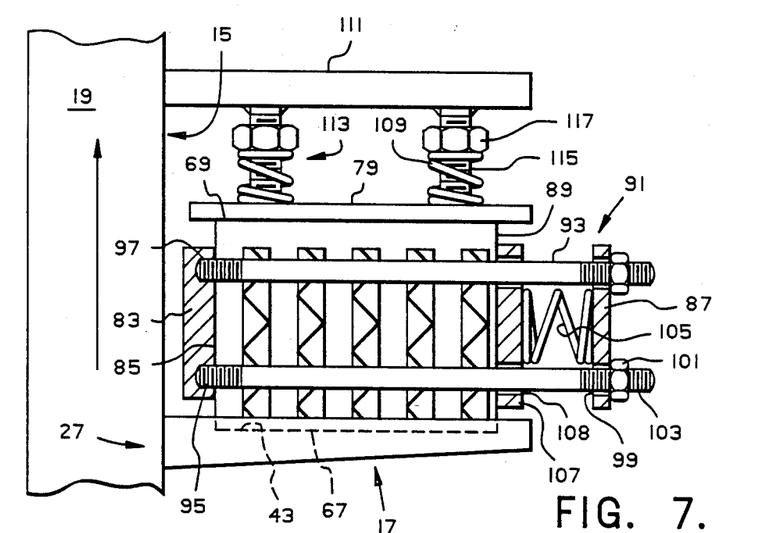
FIG. 7 is a schematic view similar to FIG. 6 showing use of ceramic springs as engagement means, and also as a delamination means.

FIG. 7 illustrates an embodiment similar to FIG. 6, where ceramic springs 109 are used in the means for securing the filter element 13 on the support mount 17, and also where a ceramic spring 105 is used, such as in the embodiment illustrated in FIG. 5, as a delamination retarding means.

Figure 8:
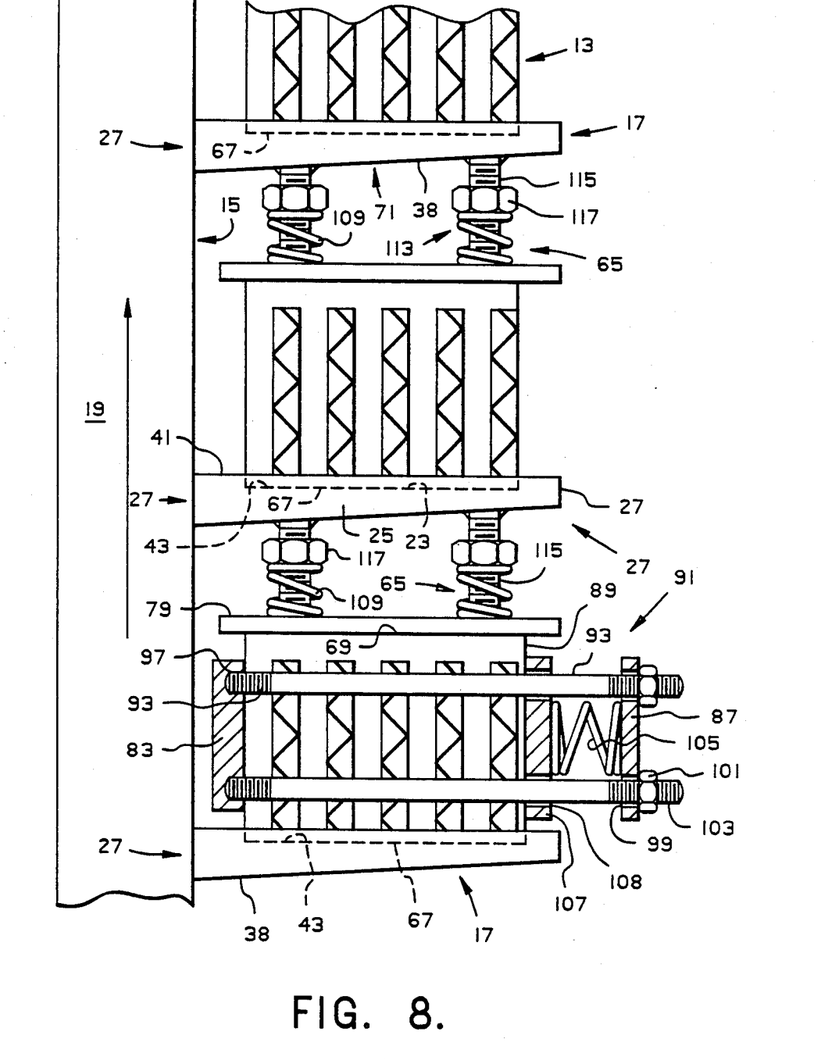
FIG. 8 is a schematic view of an embodiment of the present invention where vertical rows of filter elements and support mounts are used with ceramic springs as the engagement means therefor, and also use of a ceramic spring as a delamination retarding means for a cross flow filter.

The embodiment illustrated in FIG. 8 shows the use of the ceramic springs 109 as a means for securing the filter elements 13 on the support mount 17 and also ceramic springs 105 as delamination retarding means, in a system where a plurality of spaced superimposed filter elements 13 are present, such as previously described relative to the embodiment of FIG. 4. In this embodiment, the threaded posts 115 extend between the bottom 71 of a superimposed support mount 17 and the cushioning member 79 which rests on the top 69 of a subjacent ceramic filter element.

The ceramic springs that are usable as the securing means and delamination retarding means of the present invention are suitable where small deflections are adequate, and which would not be too brittle. Such ceramic springs are spiral springs and can be formed such as by winding a ceramic clay in the green or unfired state on a mandrel and subsequently firing the helical or spiral shape, or by grinding a helical cut in a length of standard ceramic tubing.

Such ceramic springs can be formed from materials such as alumina, silicon carbide, silicon nitride, or other ceramic material that will withstand temperatures of 900° C. or more. For example, ceramic springs of alumina material were ground from a 60 mm outside diameter by 45 mm inside diameter alumina tube. The springs were approximately 75 mm in length and had six turns (4.7×9 mm cross section) including turns that were ground to allow the ends of the spring to be flat. Tests performed on these ceramic springs indicate that the effective spring constant is 134 N/mm (Newton/mm) or 750 lbf/inch. One of the ceramic springs was tested to failure in order to determine the maximum deflection that could be expected from this design, which spring reached a deflection of 6.1 mm (0.24 in.) before failing.

By using standard spring formulas, such as that described in Roark, R. J. "Formulas for Stress and Strain", 4th Ed., McGraw-Hill (p. 209) the force deflection characteristics of the ceramic spring can be analyzed. The following formula has been found to be usable in predicting the performance of helical, rectangular cross section springs:

$$S = \frac{2\pi PR^3N}{Ga^3}\left[\frac{1}{b/3 - .209a\,[\text{Tanh}\,(a\pi/2b) + 0.004]}\right]$$

where,
S = Compression (in.)
P = Force (lbf)
R = Radius of Spring (in.)
N = Number of Turns
G = Shear Modulus (psi)
a = Smaller dimensions of cross section (in.)
b = Larger dimensions of cross section (in.)
Using this formula, dimensions were provided to make further ceramic springs of alumina that were to have a force of 50 lbf at a deflection of 0.25 in. The resultant springs were tested and found to have a force of 48 lbf at a deflection of 0.25 in.

By altering the ceramic spring cross section, number of turns, diameter, etc. a wide range of loading forces and deflections are possible even with materials as brittle as high purity alumina.

The hot gas cross flow filtering module of the present invention provides for an effective support for and seal between a filter element and a support mount and may utilize ceramic springs as securement or biasing means for a filter element to the support mount and also as a delamination retarding means. Such ceramic springs, when used as securing means avoid the need for formation of a flanged face on the filter element. The elimination of such a flange significantly reduces the cost of manufacture of the filter elements and provides a more cost effective high temperature filter system. Also, when used as a delamination retarding means, the spring forces oppose the delamination of a cross flow filter during jet blowback. Such will greatly increase the reliability of the ceramic cross flow filter and reduce maintenance of such systems.

What is claimed is:

1. A filter module for filtering particulates from a mixture of particulates in a high temperature gas comprising:
    a duct having an interior space;
    a plurality of filter elements;
    a plurality of support mounts, one of which is provided for each said filter element, horizontally secured to said duct and extending outwardly therefrom, said plurality of support mounts and filter elements provided in superimposed spaced relationship on said duct along the vertical axis of said duct, said support mount having an upper surface, which upper surface has an opening therethrough, and a chamber therein in fluid communication with said opening and with the interior space of the duct and said support mount comprising a housing having two closed side walls, an outer closed end wall and a closed bottom wall, and a top wall having said opening therethrough, with an inwardly directed rim extending from the top wall about the periphery of the lower portion of said opening;
    means for securing the filter element to the upper surface of said support mount over said opening, said filter element having inlet channels in fluid communication with the chamber of said support mount and outlet channels in fluid communication with the exterior of said duct, said inlet and outlet channels being separated by a ceramic membrane permeable to said high temperature gases and impermeable to said particulates; and
    said plurality of filter elements each being supported on the inwardly directed rim of a respective support mount by engagement means which causes contact of the lower wall of a filter element with said rim.

2. A filter module as defined in claim 1 wherein said engagement means comprises at least one columnar member extending between the closed bottom wall of a superimposed support mount and the top wall of a subjacent filter element.

3. A filter module as defined in claim 2 wherein said columnar member is adjustable, in length.

4. A filter module as defined in claim 3 wherein a cushioning plate is provided between the bottom of said columnar member and said top wall of the subjacent filter element.

5. A filter module for filtering particulates from a mixture of particulates in a high temperature gas comprising:
- a duct having an interior space;
- at least one filter element;
- a support mount for said filter element, horizontally secured to said duct and extending outwardly therefrom, said support mount having an upper surface, which upper surface has an opening therethrough, and a chamber therein in fluid communication with said opening and with the interior space of the duct, said support mount comprising a housing having two closed side walls, an outer closed end wall and a closed bottom wall, and a top wall having said opening therethrough, with an inwardly directed rim extending from the top wall about the periphery of the lower portion of said opening;
- means for securing the filter element to the upper surface of said support mount over said opening, said filter element having inlet channels in fluid communication with the chamber of said support mount and outlet channels in fluid communication with the exterior of said duct, said inlet and outlet channels being separated by a ceramic membrane permeable to said high temperature gases and impermeable to said particulates; and
- delamination retarding means associated with the filter element comprising a first end plate adjacent one end of said filter element, a second end plate spaced from the opposite end of said filter element, securing means for adjustably connecting said end plates together, and at least one ceramic spring disposed between said opposite end and said second end plate.

6. A filter module as defined in claim 5 wherein a force distributing plate is provided between said ceramic spring and said opposite end of said filter element.

7. A filter module as defined in claim 6 wherein said adjustable means comprise threaded rods, one end of which extends through one of said end plates and is threadably engaged in the other end plate, and nuts adjustable on said threaded rods to adjust the spacing between said first and second end plates.

8. A filter module for filtering particulates from a mixture of particulates in a high temperature gas comprising:
- a duct having an interior space;
- at least one filter element;
- a support mount for said filter element, horizontally secured to said duct and extending outwardly therefrom, said support mount having an upper surface, which upper surface has an opening therethrough, and a chamber therein in fluid communication with said opening and with the interior space of the duct, said support mount comprising a housing having two closed side walls, an outer closed end wall and a closed bottom wall, and a top wall having said opening therethrough, with an inwardly directed rim extending from the top wall about the periphery of the lower portion of said opening; and
- means for securing the filter element to the upper surface of said support mount over said opening comprising a horizontally extending brace fixedly secured in a vertically spaced position relative to said support mount, and engagement means between said brace and the top wall of said filter element which causes contact of the lower wall of the filter element with said rim, said engagement means comprising biasing means to bias the lower wall of said filter element against said rim, said filter element having inlet channels in fluid communication with the chamber of said support mount and outlet channels in fluid communication with the exterior of said duct, said inlet and outlet channels being separated by a ceramic membrane permeable to said high temperature gases and impermeable to said particulates.

9. A filter module as defined in claim 8 wherein said biasing means comprises at least one spring composed of a ceramic material impinging upon the top wall of the filter element.

10. A filter module as defined in claim 9 wherein a cushioning member is disposed between said ceramic spring and the top wall of said filter element.

11. A filter module as defined in claim 10 wherein said cushioning member comprises a metallic plate substantially coextensive with the upper surface of the top wall of said filtering element.

12. A filter module as defined in claim 10 including delamination retarding means associated with the filter element comprising a first end plate adjacent one end of said filter element, a second end plate spaced from the opposite end of said filter element, adjustable means for connecting said end plates together, and at least one ceramic spring disposed between said opposite end and said second end plate.

13. A filter module as defined in claim 12 wherein a force distributing plate is provided between said ceramic spring and said opposite end of said filter element.

14. A filter module as defined in claim 13 wherein said adjustable means comprise threaded rods, one end of which extends through one of said end plates and nuts adjustable on said threaded rods to adjust the spacing between said first and second end plates.

15. A filter module for filtering particulates from a mixture of particulates in a high temperature gas comprising:
- a central gas duct having an interior surface;
- a plurality of ceramic, cross flow filter elements;
- a plurality of support mounts, one of which is provided for each of said ceramic, cross flow filter elements, each horizontally secured to said central gas duct and extending outwardly therefrom, each said support mount having an upper surface, which upper surface has an opening therethrough, and a chamber therein in fluid communication with said opening and with the interior space of the central gas duct, said support mount comprising a housing having two closed side walls, an outer closed end wall and a closed bottom wall, and a top wall having said opening therethrough, with an inwardly directed rim extending from the top wall about the periphery of the lower portion of said opening, with said support mounts and ceramic, cross flow filter elements provided in superimposed spaced relationship on said central gas duct along the vertical axis of said duct; each of said ceramic, cross flow filter elements supported on the inwardly directed rim of a respective support mount by engagement means which causes contact of the lower wall of the ceramic, cross flow filter element with said rim; and
- means for securing each ceramic, cross flow filter element to the upper surface of its respective support mount over said opening, said ceramic, cross flow filter element having inlet channels in fluid communication with the chamber of said support mount and outlet channels in fluid communication with the exterior of said central gas duct, said inlet and outlet channels being separated by a ceramic membrane permeable to said high temperature gases and impermeable to said particulates.

16. A filter module as defined in claim 15 wherein said engagement means comprises a plurality of adjustable columnar members extending between the closed bottom wall of a superimposed support mount and the top wall of a subjacent ceramic, cross flow filter element.

17. A filter module for filtering particulates from a mixture of particulates in a high temperature gas comprising:

a central gas duct having an interior surface;
a plurality of ceramic, cross flow filter elements;
a plurality of support mounts, one of which is provided for each of said ceramic, cross flow filter elements, each horizontally secured to said central gas duct and extending outwardly therefrom, each said support mount having an upper surface, which upper surface has an opening therethrough, and a chamber therein in fluid communication with said opening and with the interior space of the central gas duct, said support mount comprising a housing having two closed side walls, an outer closed end wall and a closed bottom wall, and a top wall having said opening therethrough, with an inwardly directed rim extending from the top wall about the periphery of the lower portion of said opening;
said support mounts and ceramic, cross flow filter elements provided in superimposed spaced relationship of said central gas duct along the vertical axis of said duct, each of said ceramic, cross flow filter elements supported on the inwardly directed rim of a respective support mount by engagement means which causes contact of the lower wall of the ceramic, cross flow filter element with said rim, said engagement means comprising biasing means, including at least one ceramic spring, impinging upon the top wall of the ceramic, cross flow filter element, to bias the lower wall of said filter element against said rim; and
means for securing each ceramic, cross flow filter element to the upper surface of its respective support mount over said opening, said ceramic, cross flow filter element having inlet channels in fluid communication with the chamber of said support mount and outlet channels in fluid communication with the exterior of said central gas duct, said inlet and outlet channels being separated by a ceramic membrane permeable to said high temperature gases and impermeable to said particulates.

18. A filter module as defined in claim 17 wherein a cushioning member is disposed between said ceramic spring and the top wall of said filter element.

19. A filter module as defined in claim 18 wherein said cushioning member comprises a metallic plate substantially coextensive with the upper surface of the top wall of said filter element.

20. A filter module for filtering particulates from a mixture of particulates in a high temperature gas comprising:

a central gas duct having an interior surface;
a plurality of ceramic, cross flow filter elements;
a plurality of support mounts, one of which is provided for each of said ceramic, cross flow filter elements, each horizontally secured to said central gas duct and extending outwardly therefrom, each said support mount having an upper surface, which upper surface has an opening therethrough, and a chamber therein in fluid communication with said opening and with the interior space of the central gas duct;
means for securing each ceramic, cross flow filter element to the upper surface of its respective support mount over said opening, said ceramic, cross flow filter element having inlet channels in fluid communication with the chamber of said support mount and outlet channels in fluid communication with the exterior of said central gas duct, said inlet and outlet channels being separated by a ceramic membrane permeable to said high temperature gases and impermeable to said particulates; and
delamination means associated with at least one of said ceramic, cross flow filter elements, comprising a first end plate adjacent one end of said filter element, a second end plate spaced from the opposite end of said filter element, adjustable means for connecting said end plates together, and at least one ceramic spring disposed between said opposite end and said second end plate.

21. A filter module as defined in claim 20 wherein a force distributing plate is provided between said ceramic spring and said opposite end of said filter element.

22. A filter module as defined in claim 21 wherein said adjustable means comprise threaded rods, one end of which extends through one of said end plates and is threadably engaged in the other end plate, and nuts adjustable on said threaded rods to adjust the spacing between said first and second end plates.

* * * * *